(12) United States Patent
Varghese et al.

(10) Patent No.: US 11,483,031 B2
(45) Date of Patent: Oct. 25, 2022

(54) WIRELESS SWITCHING FOR CONTAINER CONTROLLER

(71) Applicant: Carrier Corporation, Palm Beach Gardens, FL (US)

(72) Inventors: Joshua Varghese, Ottawa (CA); Phani Pavan Kumar Mangaiahgari, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/743,408

(22) Filed: Jan. 15, 2020

(65) Prior Publication Data
US 2020/0228165 A1    Jul. 16, 2020

(30) Foreign Application Priority Data

Jan. 15, 2019 (IN) .............................. 201911001720

(51) Int. Cl.
*H04B 5/00* (2006.01)
*H02J 50/80* (2016.01)
(Continued)

(52) U.S. Cl.
CPC ......... *H04B 5/0031* (2013.01); *B65D 88/121* (2013.01); *H02J 50/80* (2016.02);
(Continued)

(58) Field of Classification Search
CPC .... H04B 5/0031; H02J 50/80; H02J 2310/48; H04W 12/0602; H04W 52/0274; H04W 52/0229; B65D 88/121
(Continued)

(56) References Cited

U.S. PATENT DOCUMENTS 8,275,404 B2    9/2012    Berger et al.
8,542,620 B2    9/2013    Sampathkumar
(Continued)

FOREIGN PATENT DOCUMENTS

CN    104429134 A    3/2015
CN    105101055 A    11/2015
(Continued)

OTHER PUBLICATIONS

European Search Report for Application No. 20151156.5; dated Jun. 9, 2020; 8 Pages.
(Continued)

*Primary Examiner* — Eugene Yun
(74) *Attorney, Agent, or Firm* — Cantor Colburn LLP

(57) ABSTRACT

Methods and systems for wireless switching are provided. Aspects include receiving, by a transceiver, a first activation signal from an activation device, responsive to receiving the first activation signal, transmitting, by the transceiver, network credentialing data to the activation device, receiving, by a first controller of a first device, a second activation signal from the activation device, the second activation signal comprising an activation request and the network credentialing data, responsive to receiving the second activation signal, transitioning the first device from a low power state to a high power state, and broadcasting, by the first device, a wireless network, wherein the first device comprises an access point for the wireless network.

14 Claims, 4 Drawing Sheets

(51) Int. Cl.
  *B65D 88/12* (2006.01)
  *H04W 12/062* (2021.01)
(52) U.S. Cl.
  CPC ... *H04W 12/062* (2021.01); *B65D 2590/0083* (2013.01); *H02J 2310/48* (2020.01)
(58) Field of Classification Search
  USPC .......................................................... 455/39
  See application file for complete search history.

(56) References Cited

U.S. PATENT DOCUMENTS

| | | | |
|---|---|---|---|
| 8,611,268 | B1 | 12/2013 | Thandaveswaran |
| 8,611,323 | B2 | 12/2013 | Berger et al. |
| 8,929,822 | B2 | 1/2015 | Jung et al. |
| 9,155,026 | B2 | 10/2015 | Wang |
| 9,167,521 | B2 | 10/2015 | Lin |
| 9,232,466 | B2 | 1/2016 | Chang |
| 9,294,996 | B2 | 3/2016 | Kolde |
| 9,295,099 | B2 | 3/2016 | Twitchell, Jr. et al. |
| 9,380,638 | B2 | 6/2016 | Mandiganal et al. |
| 9,426,749 | B2 | 8/2016 | Cordeiro et al. |
| 9,648,652 | B2 | 5/2017 | Granbery |
| 9,736,779 | B2 | 8/2017 | Min et al. |
| 9,806,750 | B2 | 10/2017 | Qi et al. |
| 9,826,482 | B2 | 11/2017 | Park et al. |
| 9,888,350 | B2 | 2/2018 | Steiner |
| 9,949,063 | B2 | 4/2018 | Yong et al. |
| 9,958,948 | B2 | 5/2018 | Tannenbaum et al. |
| 2004/0066328 | A1* | 4/2004 | Galley, III ........... G06Q 10/087 342/357.75 |
| 2016/0081019 | A1 | 3/2016 | Pujari et al. |
| 2016/0112947 | A1 | 4/2016 | Sahoo et al. |
| 2017/0024997 | A1 | 1/2017 | Venuturumilli |
| 2017/0223579 | A1 | 8/2017 | Lee et al. |
| 2018/0213478 | A1 | 7/2018 | Baron et al. |
| 2020/0092804 | A1* | 3/2020 | Patwardhan .......... H04W 88/06 |

FOREIGN PATENT DOCUMENTS

| | | |
|---|---|---|
| KR | 1020170004534 A | 1/2017 |
| KR | 1020170006139 A | 1/2017 |
| KR | 101838222 B1 | 3/2018 |
| WO | 2017101686 A1 | 6/2017 |
| WO | 2018085635 A1 | 5/2018 |

OTHER PUBLICATIONS

Shehadeh et al., "How to wake up an access point?" 2016 Wireless Days (WD), IEEE, Mar. 23, 2016, pp. 1-6.
Chinese Office Action for Application No. 202010037182.5; dated Aug. 16, 2022; 9 Pages.

\* cited by examiner

WIRELESS SWITCHING FOR CONTAINER CONTROLLER

CROSS-REFERENCE TO RELATED APPLICATIONS

This application claims the benefit of Indian Patent Application number 201911001720 filed Jan. 15, 2019, which is incorporated herein by reference in its entirety.

BACKGROUND

The subject matter disclosed herein relates to refrigeration systems. More specifically, the subject matter disclosed herein relates to refrigeration of containers utilized to store and ship cargo.

Goods are often transported across great distances, sometimes using a variety of different modes of transportation. One common method of transporting goods in such a manner is the use of intermodal shipping containers. Such containers are of a standardized size, such that multiple containers are easily handled and stacked. A common size is 8 feet (2.44 m) wide by 8 feet, 6 inches (2.59 m) high, with a length of either 20 feet (6.1 m) or 40 feet (12.2 meters). Other lengths can be used, such as 45 feet (13.7 m), 48 feet (14.6 m), and 53 feet (16.2 m). The benefit of standardized intermodal containers is that goods can be shipped from a variety of different locations without ever having to be removed from the container. The container itself is moved to and from a trailer, rail carrier, or ship.

Some containers include computerized portions. For example, a refrigerated container can have a computer that is used to monitor or control the refrigeration unit. The computer could, for example, change the temperature of the refrigerated container. In addition, the container can monitor the refrigerated container. One can determine the maximum temperature reached in the container, the status of the refrigerant or any electronics of the computer.

An issue that can occur is that it can be difficult to access the computer of each container. Intermodal shipping containers are typically constructed such that they are stackable and can be packed in tight quarters. Therefore, there can be 6 to 12 containers in a single stack of containers. To maximize the number of containers on a ship or at a shipping facility, the containers can be placed very close to each other. Accessing a single container in such a configuration can be difficult.

BRIEF DESCRIPTION

According to one embodiment, a method is provided. The method includes receiving, by a transceiver, a first activation signal from an activation device, responsive to receiving the first activation signal, transmitting, by the transceiver, network credentialing data to the activation device, receiving, by a first controller of a first device, a second activation signal from the activation device, the second activation signal comprising an activation request and the network credentialing data, responsive to receiving the second activation signal, transitioning the first device from a low power state to a high power state, and broadcasting, by the first device, a wireless network, wherein the first device comprises an access point for the wireless network.

In addition to one or more of the features described above, or as an alternative, further embodiments of the method may include receiving, from the activation device, a request to join the wireless network and granting, by the first device, access to the wireless network for the activation device.

In addition to one or more of the features described above, or as an alternative, further embodiments of the method may include that the first controller is associated with a shipping container.

In addition to one or more of the features described above, or as an alternative, further embodiments of the method may include transmitting, over the wireless network to the activation device, container data associated with the shipping container.

In addition to one or more of the features described above, or as an alternative, further embodiments of the method may include that responsive to transmitting the container data to the activation device, transitioning the first device from the high power state to the low power state.

In addition to one or more of the features described above, or as an alternative, further embodiments of the method may include receiving a deactivation signal and responsive to receiving a deactivation signal, transitioning the first device from the high power state to the low power state.

In addition to one or more of the features described above, or as an alternative, further embodiments of the method may include that the activation device transmits the first activation signal responsive to being within a range of the transceiver.

In addition to one or more of the features described above, or as an alternative, further embodiments of the method may include that the activation device comprises at least one of smart phone, tablet, and computer.

In addition to one or more of the features described above, or as an alternative, further embodiments of the method may include that the activation device comprises an interface coupled to the shipping container.

According to one embodiment, a system is provided. The system includes a first controller of a first device and a transceiver, wherein the transceiver is configured to receive a first activation signal from an activation device and responsive to receiving the first activation signal, transmit network credentialing data to the activation device, wherein the first controller is configured to receive a second activation signal from the activation device, the second activation signal comprising an activation request and the network credentialing data, responsive to receiving the second activation signal, transition the first device from a low power state to a high power state, and broadcast, by the first device, a wireless network, wherein the first device comprises an access point for the wireless network.

In addition to one or more of the features described above, or as an alternative, further embodiments of the system may include that the first controller is further configured to receive, from the activation device, a request to join the wireless network and grant access to the wireless network for the activation device.

In addition to one or more of the features described above, or as an alternative, further embodiments of the system may include that the first controller is associated with a shipping container.

In addition to one or more of the features described above, or as an alternative, further embodiments of the system may include that the first controller is further configured to: transmit, over the wireless network to the activation device, container data associated with the shipping container.

In addition to one or more of the features described above, or as an alternative, further embodiments of the system may include that the first controller is further configured to responsive to transmitting the container data to the activation device, transition the first device from the high power state to the low power state.

In addition to one or more of the features described above, or as an alternative, further embodiments of the system may include that the first controller is further configured to receive a deactivation signal and responsive to receiving a deactivation signal, transition the first device from the high power state to the low power state.

In addition to one or more of the features described above, or as an alternative, further embodiments of the system may include that the activation device transmits the first activation signal responsive to being within a range of the transceiver.

In addition to one or more of the features described above, or as an alternative, further embodiments of the system may include that the activation device comprises at least one of smart phone, tablet, and computer.

In addition to one or more of the features described above, or as an alternative, further embodiments of the system may include that the activation device comprises an interface coupled to the shipping container.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
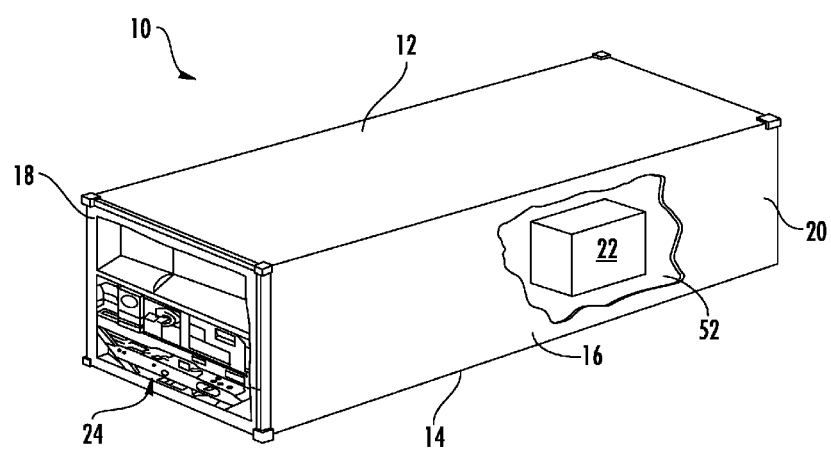
FIG. 1 is a schematic illustration of an embodiment of a refrigerated transportation cargo container.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located in the interior 52 of the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes a compressor, a condenser, an expansion valve, an evaporator, and an evaporator fan, as well as other ancillary components. The cargo container 10 described herein is merely exemplary and not intended to limit the application, uses, and/or technical scope of the present disclosure, which can be embodied in various forms known in the art.

Figure 2:
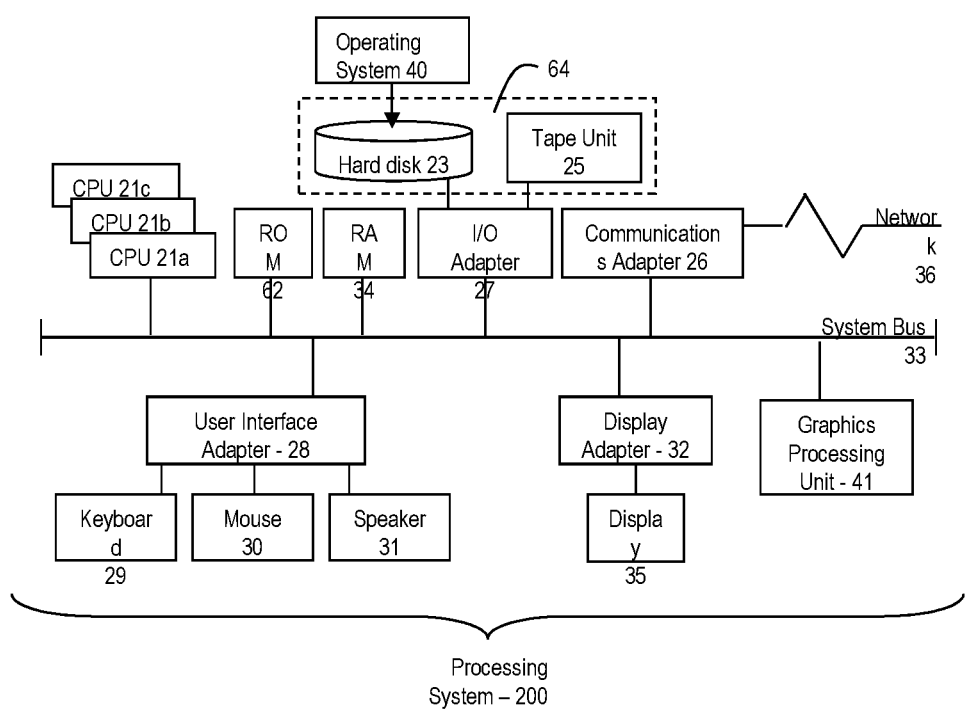
FIG. 2 depicts a block diagram of a computer system for use in implementing one or more embodiments of the disclosure.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 (RAM) and various other components via a system bus 33. Read only memory (ROM) 62 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 64. Operating system 40 for execution on the processing system 200 may be stored in mass storage 64. A network communications adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel. The processing system 200 described herein is merely exemplary and not intended to limit the application, uses, and/or technical scope of the present disclosure, which can be embodied in various forms known in the art.

Thus, as configured in FIG. 2, the system 200 includes processing capability in the form of processors 21, storage capability including system memory 34 and mass storage 64, input means such as keyboard 29 and mouse 30, and output capability including speaker 31 and display 35. In one embodiment, a portion of system memory 34 and mass storage 24 collectively store an operating system coordinate the functions of the various components shown in FIG. 2. FIG. 2 is merely a non-limiting example presented for illustrative and explanatory purposes.

In one or more embodiments, the processing system 200 can be utilized in a thermostat, controller, or other component in the refrigeration unit 24 in FIG. 1, for example.

Turning now to an overview of technologies that are more specifically relevant to aspects of the disclosure, as described above, intermodal shipping containers are very useful for shipping goods through long distances, without the need to load and unload a single container multiple times through the journey. Certain intermodal containers are computerized, such as refrigerated intermodal containers. It can be desirable to access the computer of an intermodal shipping container to control or monitor the container. However, it can be difficult to do so.

It could be possible to establish a wireless connection to the computer system in the container. Once established, a user or field engineer can access information associated with the container. This can assist with accessing the containers that may be stacked 6 to 12 containers high. However, a difficulty arises because, typically, the containers, when stacked on the shipyard, operate on battery power. The controllers on these containers have embedded wireless cards that can be operated as a wireless access point or operated to connect to a wireless access point. However, these embedded wireless cards on the container controllers consume a considerable amount of power when operating as either an access point or when connecting to a wireless network. With the controllers operating on battery power, keeping these wireless cards active or "on" can drain the battery relatively quickly.

Turning now to an overview of the aspects of the disclosure, one or more embodiments address the above-described shortcomings of the above described technologies by providing systems and methods for switching wireless systems for a container. In typical cargo containers, a user can connect to the container through a wireless connection utilizing a user device such as a table or smart phone or a pc/laptop. However, for this to be achieved, the wireless network needs to be switched (turned on) for the duration of the wireless connection. To achieve this switching, systems and methods herein provide for using a hardware transmitter (transceiver) associated with a container controller to switch on the wireless network when needed for connecting to the container controller to access data associated with the container. This transceiver can be activated when an activation device comes within range of the transceiver. The activation device can send an activation signal to the transceiver requesting network information or credentialing data for the activation of a wireless network by a wireless device on the container. The transceiver can send credentialing data such as a secure set identifier (SSID) to the activation device. Once receive, the activation device can verify the SSID and transmit a second activation signal to the transceiver to operate the wireless device to broadcast a wireless network as an access point. Once activated the activation device can connect to the wireless network and access data associated with the container.

Figure 3:
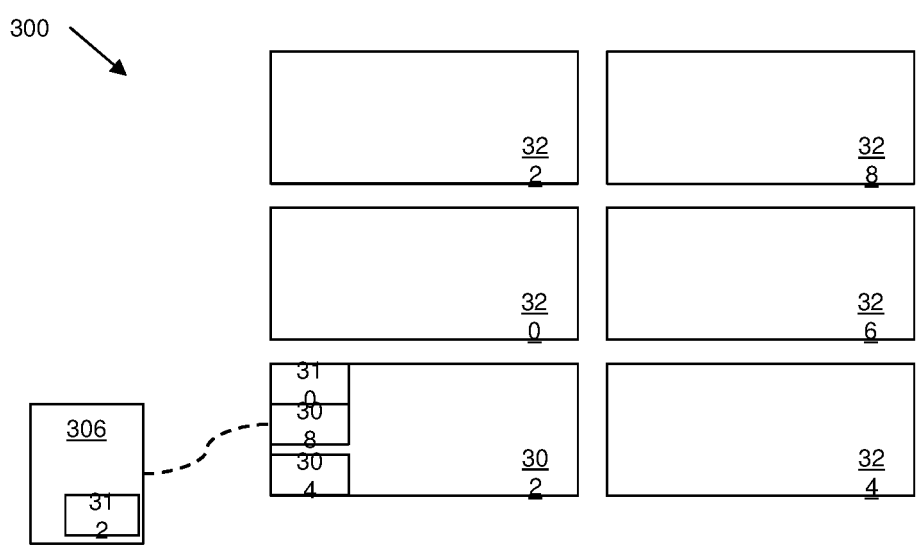
FIG. 3 depicts a block diagram depicting a group of containers each including a container controller having a wireless card embedded in the controller according to one or more embodiments of the disclosure.

Turning now to a more detailed description of aspects of the present disclosure, FIG. 3 depicts a block diagram depicting a group of containers 300 each including a container controller 304 having a wireless card 308 embedded in the controller according to one or more embodiments. The container controllers also include a container transmitter 310. In one or more embodiments, an activation device 306 includes a hardware transmitter 312. The hardware transmitter 312 can utilize low energy proximity sensing to transmit a signal to be picked up by a compatible system. The hardware transmitter 312, when within range of the container transmitter 310, can transmit an activation signal to this container transmitter 310. In one or more embodiments, the hardware transmitter 312 transmits the activation signal to the container transmitter 310. In the activation signal is a request to get a secure set identifier (SSID) from the container transmitter 310. The container transmitter 310 can verify the activation signal request and then return the SSID to the hardware transmitter 312. Once the SSID is received by the hardware transmitter 312, the hardware transmitter 312 can send a request to the container controller 304 to activate the wireless card 306 to broadcast a wireless network from the container 302. The activation device 306, having the SSID, can connect to the wireless network broadcast from the container 302. Once connected, the activation device 306 can access data associated with the container 302 through the container controller 304. In one or more embodiments, the activation device 306 can be a user device such as, for example, a smart phone, tablet, or laptop. In one or more embodiments, the data associated with the container 302 can include information such as, for example, contents data, transportation data, status data for the container, and the like.

In one or more embodiments, the activation signal transmitted by the activation device 306 can be received by the container transmitter 310 that can be operated in a low power mode prior to receiving the activation signal. The activation signal thus "wakes up" the container transmitter 310 which then notifies the container controller 304 to activate the wireless card 308. The container controller 304 transitions the wireless card 308 from a low power mode to a high power mode. Or, in other embodiments, the container transmitter 310 can activate the wireless card 308 directly to turn on the wireless card (e.g., transition from low power mode to a high power mode). The illustrated example includes containers 320-328 not within range of the activation device 306. These containers 320-328 might not be from the same company owning the container 302.

In one or more embodiments, the hardware transmitter 312 and the container transmitter 310 can be a BLUETOOTH™ low-energy beacon that can transmit an identifier to the activation device 306 to be utilized to configure the wireless network for the container 302. In one or more embodiments, the hardware transmitter 312 and the container transmitter 310 can be radio frequency (RF) transmitters. In one or more embodiments, the activation device 306 can be an interface coupled to one of the shipping containers. For example, a key pad or display can be on the side of a shipping container and can be utilized to transmit the activation signal to turn on the wireless network.

In one or more embodiments, the container controllers 304, transmitters 310, 312, wireless cards 308, and activation device 306 can be implemented on the processing system 200 found in FIG. 2. The container 302 benefits from improved energy efficiency as the operation of the wireless card 308 is utilized when there is active accessing of data associated with the container 302. In one or more embodiments, after a certain amount of time passes or when the hardware transmitter 312 is no longer in range of the container 302, the wireless card 308 can be turned off or revert back to a low power mode.

In one or more embodiments, the activation device 306 (e.g., phone or tablet) includes an applications that sends out an activation signal (e.g., beacons, RF signals, etc.) to probe all hidden SSIDs. In response to the activation signal with a valid credential, all the containers that received the signal can send their corresponding SSID information in return. All such collected SSIDs are populated in a list box in the activation device 306 application. This has the added benefit of helping fetch the container IDs list automatically especially when SSIDs are hidden for security reasons.

Also, one or more embodiments circumvent the limitations on highly restricted phones/tablets operating systems. The application on the activation device 306 can scan all the WiFi SSIDs around (container IDs) and then populate a list of container IDs on the application. A user will select one of the container IDs (e.g., SSIDs) from a list and then ask the application to automatically connect/join/associate the selected network. Some manufacturer's operating systems do not let an application control the WiFi association/disassociation. It is the user (via the O/S WiFi settings) who has to manually associated/disassociate to/from a network. To circumvent the restrictive operating systems, the activation device 306 user manually connects/associates to one access point network, where more than one container is already connected to in the form of clients. Now, instead of manually connecting to multiple networks manually one by one, the user can now connect to one container and access all the connected containers.

Figure 4:
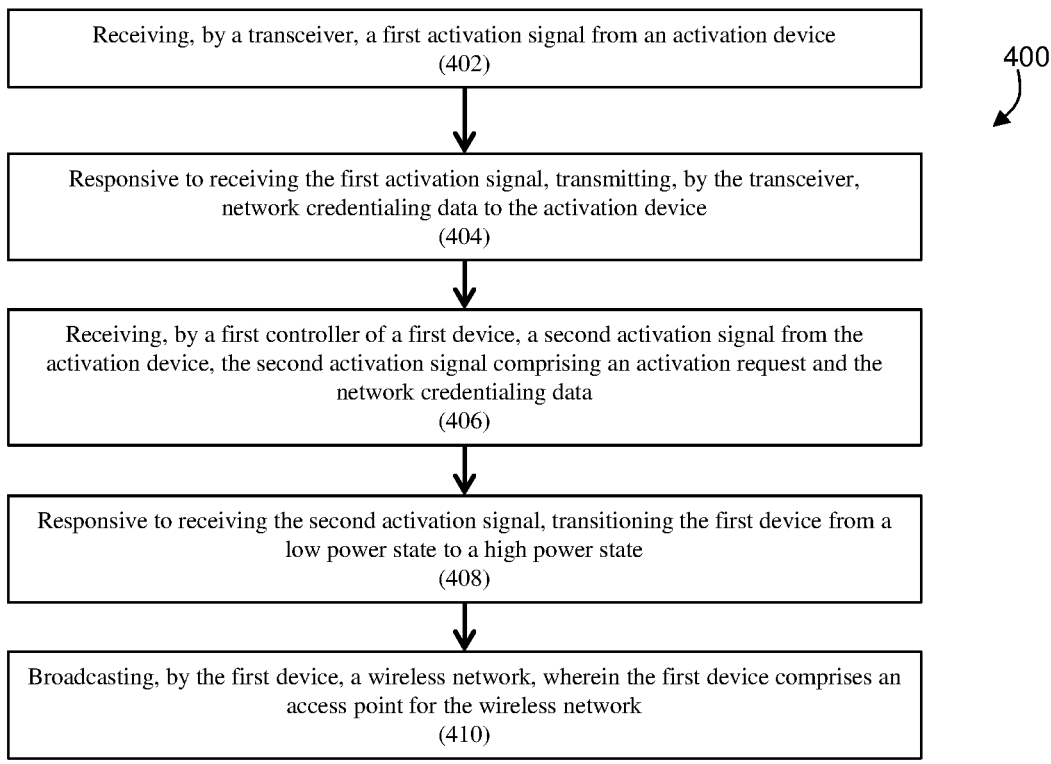
FIG. 4 depicts a flow diagram of a method for wireless switching according to one or more embodiments of the disclosure.

FIG. 4 depicts a flow diagram of a method for wireless switching according to one or more embodiments. The method 400 includes receiving, by a transceiver, a first activation signal from an activation device, as shown in block 402. At block 404, the method 400 includes responsive to receiving the first activation signal, transmitting, by the transceiver, network credentialing data to the activation device. Also, at block 406, the method 400 includes receiving, by a first controller of a first device, a second activation signal from the activation device, the second activation signal comprising an activation request and the network credentialing data. The method 400 includes responsive to receiving the second activation signal, transitioning the first device from a low power state to a high power state, as shown at block 408. And at block 410, the method 400 includes broadcasting, by the first device, a wireless network, wherein the first device comprises an access point for the wireless network.

In one or more embodiments, the activation device 306 with already known/valid (i.e., active/not yet expired) credentialing data and known SSID can directly turn on the wireless network instead of sending/waiting on a second activation signal.

Additional processes may also be included. It should be understood that the processes depicted in FIG. 4 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for wireless switching, the method comprising:

receiving, by a transceiver of a shipping container, a first activation signal from an activation device;

verifying, by the transceiver of the shipping container, the first activation signal;

responsive to receiving and verifying the first activation signal, transmitting, by the transceiver, network credentialing data to the activation device, the network credentialing data including a container identifier of the shipping container;

receiving, by a first controller of a first device of the shipping container, a second activation signal from the activation device, the second activation signal comprising an activation request and the network credentialing data;

responsive to receiving the second activation signal, transitioning the first device from a low power state to a high power state; and broadcasting, by the first device, a wireless network, wherein the first device comprises an access point for the wireless network;

receiving, by the first device from the activation device, a request to join the wireless network; and granting, by the first device, access to the wireless network for the activation device.

2. The method of claim 1, further comprising:

transmitting, over the wireless network to the activation device, container data associated with the shipping container.

3. The method of claim 2, further comprising:

responsive to transmitting the container data to the activation device, transitioning the first device from the high power state to the low power state.

4. The method of claim 1, further comprising:

receiving a deactivation signal; and responsive to receiving a deactivation signal, transitioning the first device from the high power state to the low power state.

5. The method of claim 1, wherein the activation device transmits the first activation signal responsive to being within a range of the transceiver.

6. The method of claim 1, wherein the activation device comprises at least one of smart phone, tablet, and computer.

7. The method of claim 1, wherein the activation device comprises an interface coupled to the shipping container.

8. A system for wireless switching, the system comprising:
   a first controller of a first device of a shipping container; and
   a transceiver of the shipping container;
   wherein the transceiver is configured to:
   receive a first activation signal from an activation device;
   verify the first activation signal; and
   responsive to receiving and verifying the first activation signal, transmit network credentialing data to the activation device, the network credentialing data including a container identifier of the shipping container;
   wherein the first controller is configured to:
   receive a second activation signal from the activation device, the second activation signal comprising an activation request and the network credentialing data;
   responsive to receiving the second activation signal, transition the first device from a low power state to a high power state;
   broadcast, by the first device, a wireless network, wherein the first device comprises an access point for the wireless network;
   receive, from the activation device, a request to join the wireless network; and
   grant access to the wireless network for the activation device.

9. The system of claim 8, wherein the first controller is further configured to: transmit, over the wireless network to the activation device, container data associated with the shipping container.

10. The system of claim 8, wherein the first controller is further configured to:
    responsive to transmitting the container data to the activation device, transition the first device from the high power state to the low power state.

11. The system of claim 8, wherein the first controller is further configured to:
    receive a deactivation signal; and
    responsive to receiving a deactivation signal, transition the first device from the high power state to the low power state.

12. The system of claim 8, wherein the activation device transmits the first activation signal responsive to being within a range of the transceiver.

13. The system of claim 8, wherein the activation device comprises at least one of smart phone, tablet, and computer.

14. The system of claim 8, wherein the activation device comprises an interface coupled to the shipping container.

* * * * *